Nov. 11, 1969  C. W. SCOGGINS  3,477,244
SLUSH ICE CARBONATION MACHINE
Filed Dec. 1, 1967  4 Sheets-Sheet 1

Cecil W. Scoggins
INVENTOR.

BY Clarence A. O'Brien
and Harvey B. Jackson
Attorneys

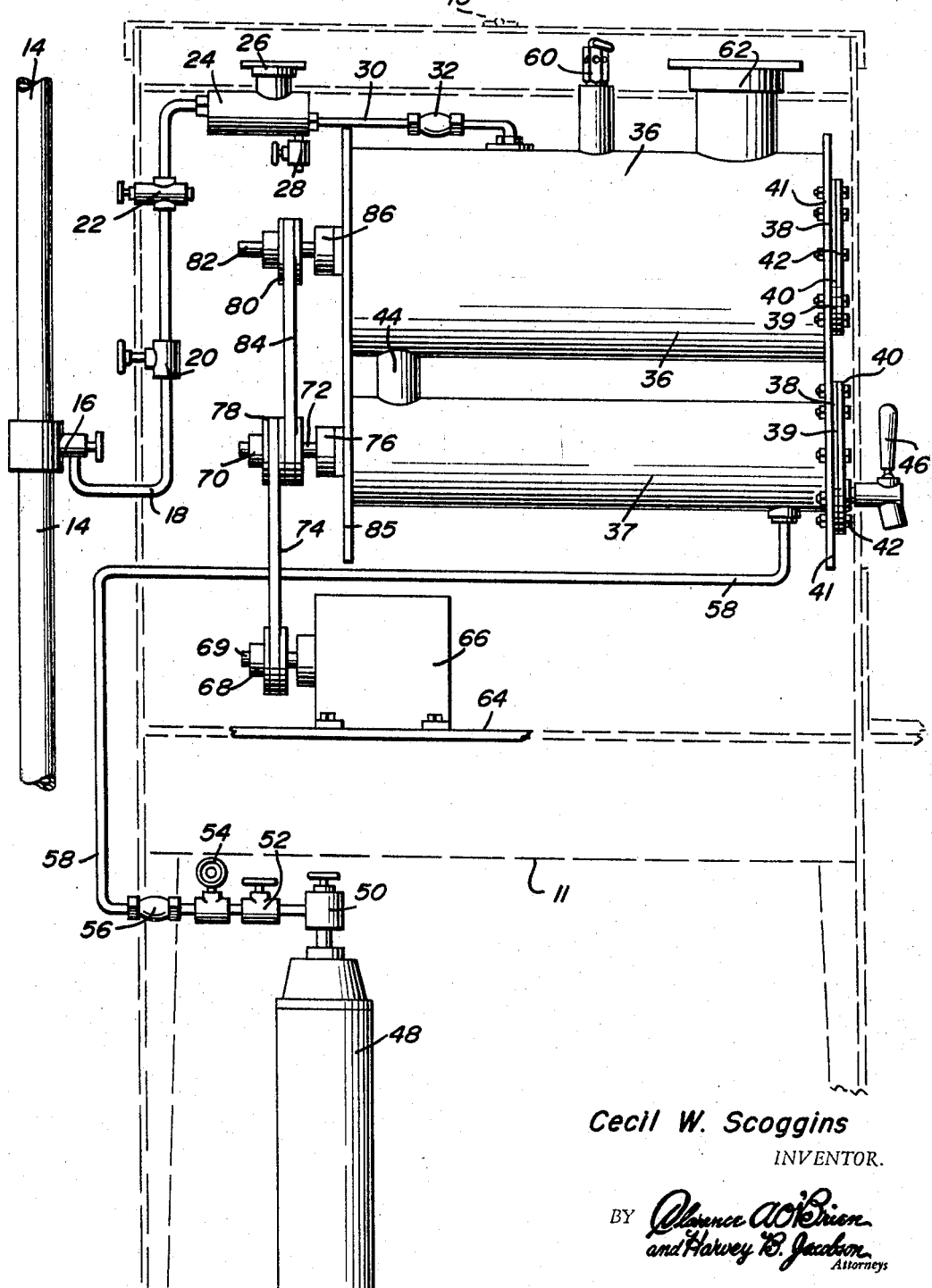

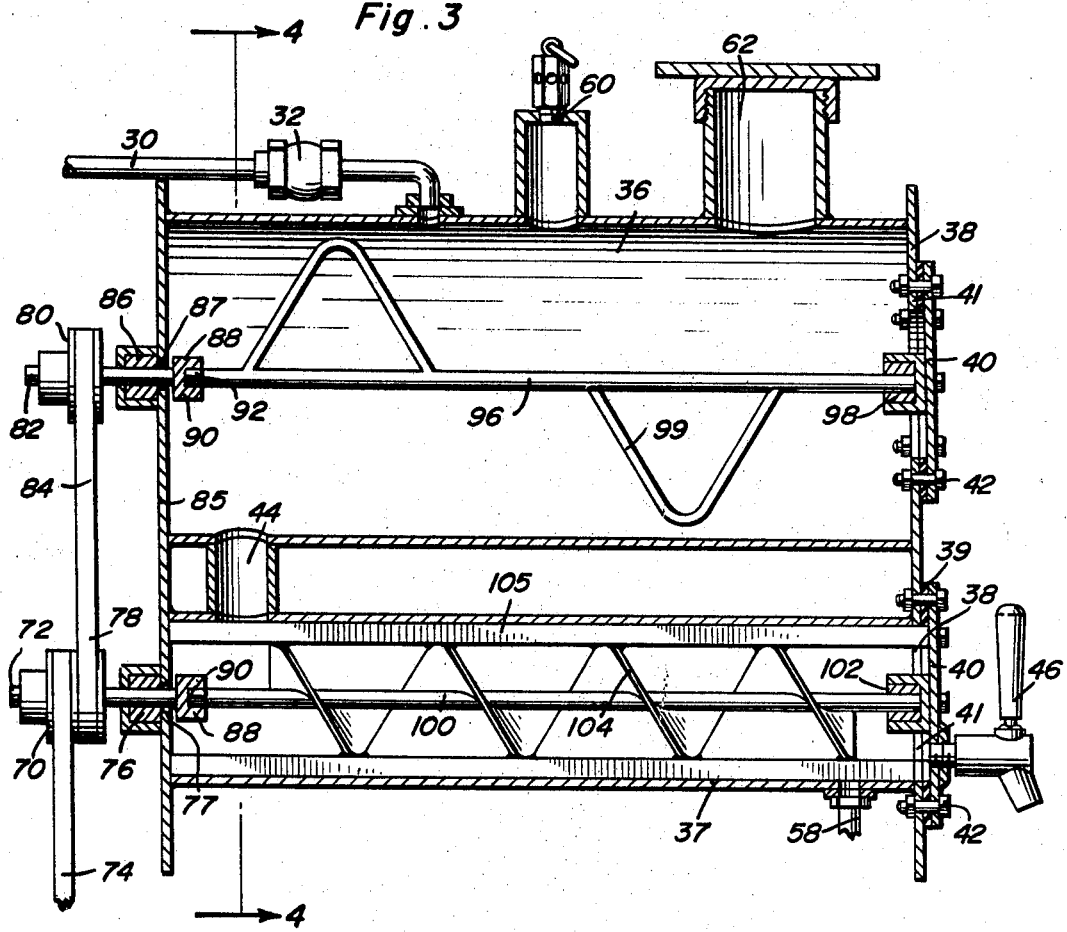

Cecil W. Scoggins
INVENTOR.

United States Patent Office 3,477,244
Patented Nov. 11, 1969

3,477,244
SLUSH ICE CARBONATION MACHINE
Cecil W. Scoggins, 1525 Piedmont Ave. NE.,
Atlanta, Ga. 30324
Filed Dec. 1, 1967, Ser. No. 687,386
Int. Cl. F25c 7/16
U.S. Cl. 62—306                                    1 Claim

ABSTRACT OF THE DISCLOSURE

A slush ice dispenser and a method for producing the same including a controlled water inlet means depositing a quantity of water into an agitator tank. A similarly controlled supply provides the agitator tank with a base liquid including vegetable gum and glycerine. The agitator tank communicates with a freezer cylinder which receives a portion of the liquid mixture from the agitator tank and chills the same to a degree resulting in an increased viscosity of the liquid mixture and a commensurate production of frozen particles therein. The liquid mixture is subjectd to saturation carbonation thereby resulting in the production of a fluffy and highly stacked slush ice carbonated food product which is selectively dispensed from the freezer cylinder.

The field of the present invention relates to a method and means for producing a slush liquid containing frozen particles therein. More particularly, this invention relates to the production of a saturated carbonated slush ice food product.

The prior art includes methods and apparatus for making slush ice beverage and other food products such as soft ice cream by means of freezing the liquid and scraping the refrigerated surface of a storage tank. However, devices operating in such a manner are prone to jamming due to a packing of scraped frozen material around rotating parts. Further, such prior art devices have been restricted to the production of uncarbonated food products. Past inventions have usually required a pre-cooling of the mixture before the mixture well before the mixture is ready to be frozen. This approach results in an economic disadvantage due to the extended degree of refrigerated required. Further, prior devices have relied upon a fixed installation thereby requiring a delivery of liquid mixture components through a fairly complex regulated pipe system. The prior art utilizes a base of vegetable gum and glycerine in the production of an ice slush but the addition of such a base to the main liquid component is usually accomplished manually.

In summaray of the invention, a first agitator tank contains a liquid mixture which is continually stirred. This tank communicates with a freezer cylinder which chills a portion of the liquid mixture delivered from the agitating tank. The liquid contained within the freezer cylinder is chilled thereby increasing the viscosity thereof and forming frozen particles therein. A dispensing spigot communicates with the freezer cylinder and effectuates the dispensing of the slush ice product from the cylinder. Carbon dioxide is introduced into the agitating tank and the freezing cylinder for saturating the liquid mixture contained therein with carbonation. The agitating tank is provided with a filler cap for enabling the tank to be filled manually. In a different mode for filling the agitating tank, a system is provided whereby a base of vegetable gum glycerine is stored within an intermediary tank which receives a regulated flow of water therethrough. The final contents of the intermediary tanks are then conducted by a pipe into the agitator tank. A still further mode of filling operation is possible by utilizing solenoid valve controlled filling systems for both the water supply and base supply thus obviating the necessity for manual implementation of the filling process. The present device is adapted for the production of a highly carbonated slush ice beverage as well as soft ice cream. Accordingly, among the salient objects of the present invention are to provide an:

Apparatus for carbonating a slush ice food product with a high stacking or overrun characteristic, and Apparatus for producing a slush ice product, the apparatus being fillable in a number of different ways ranging from manual fill to a completely automatic operation thereby increasing the flexibility of the machine.

These together with other objects and advantages which will become subsequently apparant reside in the details of construction and operation as more fully hereinafter described and claimed, reference being had to the accompanying drawings forming a part hereof, wherein like numerals refer to like parts throughout, and in which:

FIGURE 2 is a side elevational view illustrating the present apparatus.

FIGURE 3 is a fragmentary sectional view illustrating the interior of the agitating tank and freezer cylinder.

Figure 1:
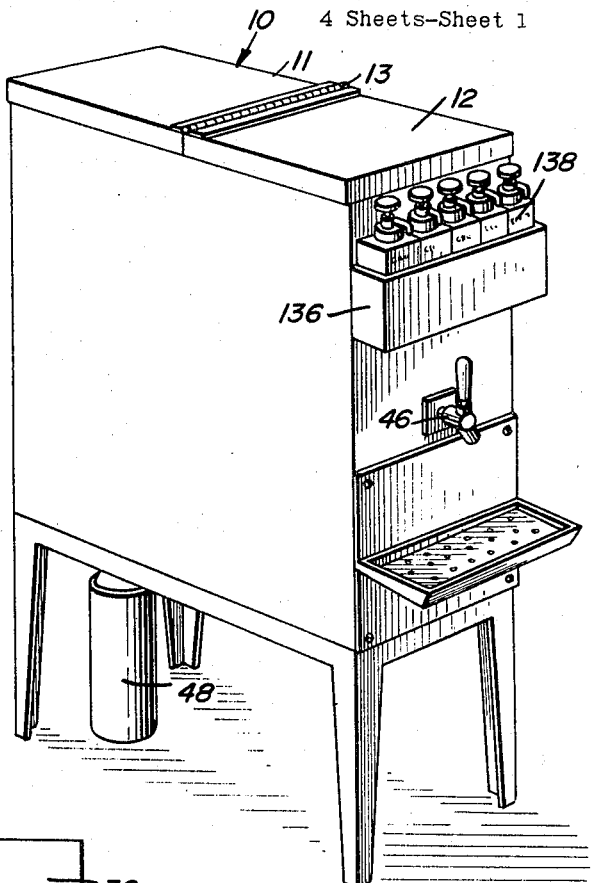
FIGURE 1 is a perspective view illustrating the present apparatus within a typical dispenser housing.
Figure 4:
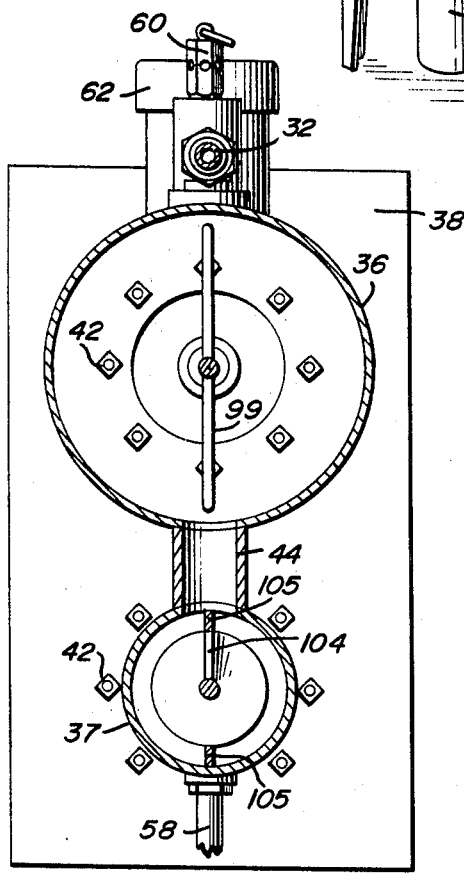
FIGURE 4 is a transverse sectional view taken along a plane through section line 4—4 of FIGURE 3.

Referring specifically to the drawings, reference numeral 10 generally denotes a slush ice dispensing machine in a typical construction. The main exterior portion of this dispenser includes a housing 11 typified by a lid 12 which may be opened by means of a hinged connection 13.

Attention is directed to FIGURES 2 and 3 of the drawings which illustrate one embodiment of the present invention. Water is supplied to the dispenser by means of a main water line 14 which includes the connection of a saddle valve 16 for diverting flow from the main water line into the conduit system explained hereinafter. The saddle valve outlet is connected by a pipe section 18, the opposite end of the pipe section terminating in an intermediate storage stainless steel tank 24. In order to regulate flow into the tank, a cut-off valve 20 and a pressure regulator 22 are serially connected within the pipe section 18. The intermediate storage tank 24 is provided with a filler cap 26 for filling the tank with a base liquid composed of vegetable gum and glycerine. The drain plug 28 is provided along the base of the intermediate storage tank for permitting the draining of the contents therein when desired.

As seen in FIGURES 2 and 3 of the drawings, the pipe section 30 is connected with the outlet of the intermediate storage tank 24. The pipe section 30 terminates at an end opposite the intermediate storage tank outlet to an agitator tank 36. In order to prevent backflow from the agitator tank into the pipe section 30, a gas escape check valve 32 of conventional design is inserted within the pipe section. A freezer cylinder 37 is disposed below the agitator tank 36 and communicates therewith through a pipe section 44. Both the agitator tank and freezer cylinder terminate at a right end wall thereof by a common rectangular plate 38. This plate includes two vertically aligned apertures 41 which are circumscribed by pressure sealing gasket members 39, each gasket being disposed outwardly of the plate. A circular cover plate 40 is disposed outwardly of each gasket and fastened to the rectangular plate 38 by means of suitable fasteners 42. A dispensing spigot 46 communicates with the freezing cylinder so that operation of the spigot results in the dispensing of a slush ice product produced by the machine as explained hereinafter.

In addition to forming a slush ice product, carbonation of the product is achieved in a manner best illustrated in FIGURE 2. The carbon dioxide tank 48 receives a tank valve 50 for regulating the flow of carbon dioxide from the tank. A pressure regulator 52 and pressure gauge 54 are serially connected to the tank valve via a pipe section 58. This latter mentioned pipe section is connected to the base of the freezing cylinder 37. A check valve 56 of conventional design is inserted within the pipe section 58 thereby preventing a backflow of liquid and more importantly carbon dioxide from the freezer cylinder into the carbon dioxide tank 48. A conventional pressure relief valve 60 is connected within the agitator tank 36 for protecting against over-pressurization of the agitator tank and freezing cylinder. It is appreciated that the carbonation of the liquid mixture is effectuated simultaneously within the agitator tank as well as the freezer cylinder. A sealed filler cap 62 is provided in the agitator tank, in an upper portion thereof for permitting manual filling of the agitator tank with the liquid mixture. Thus, a conduit system is not essential to the present invention since a manual filling of the agitator tank may be facilitated.

As seen in FIGURE 2 of the drawings, a horizontal support bracket 64 is disposed interiorly of the dispenser housing 11. An electrical motor 66 is fastened to the bracket and provides rotational motion to a pulley wheel 68 mounted upon the motor drive shaft 69. A second pulley wheel 70 is disposed vertically above and coplanar with the first pulley wheel 68. The second pulley wheel is mounted upon a rotating shaft 72 which is supported within a bearing block 76, the latter being attached to a correspondingly positioned end wall portion of the freezer cylinder 37. A pulley belt 74 is entrained about the aforementioned first and second pulley wheel thereby transferring rotational motion from the motor 66 to the pulley shaft 72. A third pulley wheel 78 is disposed coaxial with the second pulley wheel 70 and is attached thereto. Accordingly, rotation of the shaft 72 imparts an identical rotational motion to the pulley wheels 70 and 78 both being keyed to the shaft 72. A fourth pulley wheel 80 is orientated vertically above and coplanar with the third pulley wheel 78. A pulley belt 84 is entrained about the third and forth pulley wheels 78 and 80, respectively. This latter pulley wheel is keyed to a rotating shaft 82 rotatably supported within a bearing block 86 attached to a correspondingly positioned wall portion of the agitator tank 36.

Attention is directed to FIGURE 3 of the drawings which illustrates the utilization of the aforementioned pulley system. The shafts 72 and 82 extend through apertures 77 and 87 respectively, formed within correspondingly positioned wall portions. These shafts terminate at the inward portions thereof in socket connectors 90, receiving a polygonal end section 92 of a separate shaft. The first of these shafts denoted by reference numeral 96 extends longitudinally across the agitator tank, the opposite end portion of the shaft resides within a bearing block 98 extending inwardly from the opposite tank end wall 38. Generally L-shaped stirring rods 99 are fixedly connected to the shaft 96 and extend outwardly and perpendicularly thereto. To effectuate stirring in the agitator tank, two such L-shaped rods may be used, the rods extending outwardly from one another by 180°. The vertical height of each rod 99 extends to a dimension almost equal to the interior radius of the tank 36. The stirring operation encourages absorption of gas into the liquid mixture.

As further seen in FIGURE 3 of the drawings, the lower pulley shaft 72 keyed to the pulley wheels 70 and 78 extends interiorly of the aperture 77 formed within the correspondingly positioned end wall 85 of the freezer cylinder 73 through a point concentric with a cylindrical bearing block 76. The inward end portion of the shaft 72 terminates in a socket 88. A polygonal shaft end portion 90 of a separate shaft 100 is adapted to be inserted within the socket 88. The shaft 100 is orientated longitudinally within the freezing cylinder 37 and is coaxial therewith. The opposite end portion of the shaft 100 is received within a cylindrical bearing 102 depending inwardly from the freezer cylinder end wall 38. A helical auger structure 104 is mounted concentrically about the shaft 100. Two diametrically opposing straight scraper blades 105 are longitudinally affixed to the outer edge of the helical auger, the outward surfaces of these blades substantially bear against the interior surface of the freezing cylinder 37, substantially along the entire length thereof. These blades prevent the accumulated buildup of frozen mixture on the interior surface of the freezing cylinder. Also, the blades in motion effect carbonation saturation of the mixture.

In operation of the device, and as seen in FIGURE 3 of the drawings, a liquid mixture including vegetable gum, glycerine, and water is deposited into the agitator tank 36 from the pipe section 30. The motor driven pulley 80 rotates the shaft 96 as explained hereinbefore, thereby causing the L-shaped rod to stir the liquid mixture within the agitator tank 36. The agitator tank is chilled because of its attachment to the freezer cylinder. This causes pre-chilling of the liquid in the tank. Thus, initial absorption of gas into the mixture is advanced. Disposed beneath the agitator tank is the freezer cylinder 37 which communicates with the agitator tank by means of the pipe section 44. A portion of liquid mixture deposited within the freezer cylinder 37 is exposed to chilling temperatures by suitable insulated refrigerating coils or plates (not shown) disposed around the freezer cylinder 37. This coupled with carbonation causes an increase in the viscosity of the fluid contained therein. Upon continued exposure to the chilling temperatures, frozen particles are formed within the viscous fluid which is continually circulated through the freezing cylinder by means of the rotating helical auger structure within the freezer cylinder. In addition, the helical auger structure conveys the ice slush formed within the freezer cylinder toward the dispensing spigot so that an actuation of the spigot will cause a preselected quantity of ice slush which is fluffy to exit.

Figure 5:
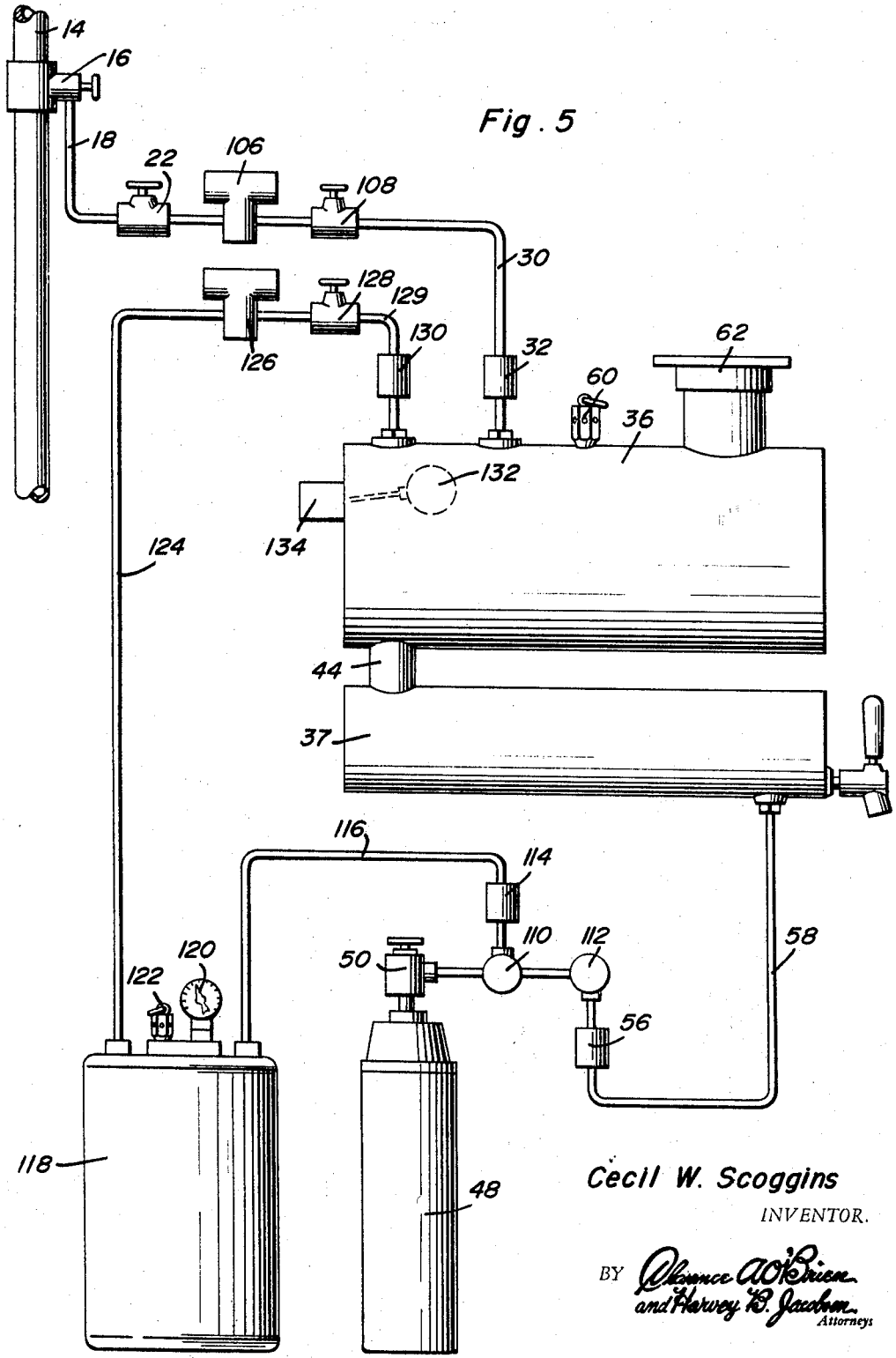
FIGURE 5 is a side elevational view illustrating the apparatus of the present invention capable of an automatic filling operation.

Another embodiment of the present invention is illustrated in FIGURE 5 of the drawings which shows an automatic filling device for the present invention. From an inspection of the figure it is to be appreciated that the agitator tank and freezer cylinder are identical in construction as discussed hereinbefore. Thus, this latter embodiment is also constructed to withstand carbonation pressure. Further, the employment of a carbon dioxide tank for purpose of carbonating the ice slush is included in this alternate embodiment. As explained in connection with the prior embodiment the main line 14 supplies water through a saddle valve 16 to a pipe section 18, said water being subjected to a pressure regulator 22. In series with this pressure regulator is a normally closed solenoid actuated valve 106 which is connected to a needle valve 108, the latter including an outlet which is connected to a pipe section 30, the opposite end of which terminates within the agitator tank 36 through the intermediary of a check valve 32, the latter preventing backflow of the liquid and more importantly carbon dioxide content in the agitator tank back into the pipe section 30. The significance of the normally closed solenoid actuated valve is explained hereinafter.

Unlike the previous embodiment, the alternate embodiment includes a carbon dioxide tank which not only serves to carbonate the ice slush mixture, but also includes a parallel branch from the tank valve for purposes to become immediately apparent. This aforementioned parallel tank connection includes two pressure regulators 110 and 112, the latter governing gas flow to the freezer cylinder for purposes of saturation carbonation. The first mentioned pressure regulator 110 is connected to a check valve 114 which is in turn connected to a pipe section 116. The check valve 114 prevents backflow of liquid and more importantly gas through the pipe section 116 into the tank. The opposite end of the pipe section 116 terminates in the entry port of a mixture tank 118 filled with a base mixture composed of vegetable gum and glycerine. This mixture tank is outfitted with a filler cap and level gauge assembly 120 providing a means for filling the tank and a means for monitoring the pressure therein. A pressure relief valve 122 maintains the pressure within the tank at a safe level. The present invention is designed to allow uniform pressurization of the agitator tank and the freezer cylinder. Also, the rate of gas feed to the device is governed by the rate of absorption of gas by the mixture. An outlet port of the mixture tank 118 is provided with a pipe section 124 which is serially connected through a normally closed solenoid actuated valve 126 to a needle valve 128, the outlet of which communicates with the agitator tank 36 through a pipe section 129. Intermediate the needle valve 128 and the agitator tank, is a check valve 130 which prevents gas backflow from the agitator tank into the pipe section 129. Accordingly, it is appreciated that the agitator tank receives component liquids from two independent supply sources. The first pipe section 30 providing the agitator tank with water and the second pipe section 129 providing the tank with the vegetable gum and glycerine base. In order to explain the function of the solenoid actuated valve 106 and 126, attention is directed to the float member 132 shown in phantom in the agitator tank. This float changes its vertical position in accordance with the level of mixture liquid contained within the agitator tank. The float member 132 is mechanically linked to a suitable switch 134 which is turned on when the vertical position of the float 132 is displaced to a preselected position indicative of a "low" tank. When the switch 134 is turned on, an electrical circuit (not shown) is actuated thereby resulting in the simultaneous opening of the solenoid actuated valves 106 and 126. These valves are opened in unison so that the base liquid and water are supplied simultaneously to the agitator tank in such quantities as regulated by settings of the valve and regulator structures associated with the respective liquid flow paths. Accordingly, the float member 132 regulates the filling of the agitator tank in response to the consumption of liquid mixture therein. It is appreciated that this operation is completely automatic and requires no manual implementation.

In actual utilization of the present apparatus, the fluffy slush ice product having a high stacking or overrun appearance is dispensed into a cup and then flavored with fruit syrup or the like stored in containers 138 shown in FIGURE 1. These containers are stored on a suitable shelf 136.

The foregoing embodiments present a mechanization for a method of producing a slush ice carbonated food product. The method encompasses both a production requiring a certain amount of manual implementation as well as a completely automatic process.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for producing an dispensing a carbonated slush food product comprising a first means for storing a first liquid portion of the food product, a rotatable shaft disposed between oppositely confronting walls of the first storage means, a plurality of L-shaped rods being attached to the shaft for effecting agitation of the liquid portion, a removable port cover spaced in coaxial alignment with one end of the rod for permitting passage of the rod therethrough during the assembly and disassembly of the device, high pressure gasket means for sealing the port cover, first journal means connected to the interior of the cover for receiving one end of the rod, coupling means connected to the opposite end of the rod, a shaft passing through the wall of the device for connection to the coupling means, means for rotating the shaft thereby causing the coupling to turn which in effect causes rotation of the agitator rods, conduit means for directing fluid into the first storage means, check valve means serially connected with said conduit means to prevent escape of a carbonation medium from the first storage means relief valve means communicating with the first storage means to prevent over pressurization thereof, a freezer cylinder disposed in spaced vertically aligned relation, means for connecting the first storage means and the freezer cylinder, the freezer cylinder serving to store a second liquid portion of the food product, a rotatable shaft disposed between oppositely confronting walls of the freezer cylinder, helical blade means attached to the latter mentioned shaft for effecting churning of the second liquid portion and scraping of the interior freezer compartment wall thereby freeing the same of frozen accumulation, a removable port cover spaced in coaxial alignment with one end of the shaft for permitting passage of the shaft therethrough during assembly and disassembly of the device, high pressure gasket means for sealing the latter mentioned port cover, journal means connected to the interior of the cover for receiving one end of the latter mentioned shaft, coupling means connected to the opposite end of the shaft, an additional shaft passing through the wall of the freezer chamber for connection to the latter mentioned coupling means, the aforementioned means for rotating the shaft in the first storage means being linked to the latter mentioned shaft thereby causing rotation of the helical blade in the freezer compartment, conduit means for introducing compressed gas into the freezer cylinder, the gas being free to equally pressurize the first storage means and the freezer cylinder, whereby the introduced gas causes saturation carbonation of the liquid portion in the freezer cylinder, and a dispensing spigot connected to the freezer cylinder for selectably permitting pressurized dispensing of the saturated carbonated liquid portion in the freezer cylinder.

References Cited

UNITED STATES PATENTS

| | | | |
|---|---|---|---|
| 3,045,441 | 7/1962 | Patch et al. | 62—68 |
| 3,319,436 | 5/1967 | Wilch | 62—136 X |
| 3,348,737 | 10/1967 | Yingst et al. | 222—136 X |
| 3,359,748 | 12/1967 | Booth | 62—342 X |
| 3,398,550 | 8/1968 | Lents | 62—306 |
| 3,402,562 | 9/1968 | Menzel | 62—342 X |
| 3,403,523 | 10/1968 | Bauer et al. | 62—307 X |
| 3,403,524 | 10/1968 | Mitchell et al. | 62—306 X |
| 3,400,551 | 9/1968 | Booth et al. | 62—306 X |

WILLIAM E. WAYNER, Primary Examiner

U.S. Cl. X.R.

62—69; 99—136